(12) United States Patent
Cho

(10) Patent No.: US 7,256,960 B2
(45) Date of Patent: Aug. 14, 2007

(54) DAMPING STRUCTURE OF A HARD DISK DRIVE

(75) Inventor: Han-rae Cho, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 347 days.

(21) Appl. No.: 10/986,023

(22) Filed: Nov. 12, 2004

(65) Prior Publication Data

US 2005/0168866 A1 Aug. 4, 2005

(30) Foreign Application Priority Data

Jan. 30, 2004 (KR) .................... 10-2004-0006118

(51) Int. Cl.
*G11B 17/00* (2006.01)
(52) U.S. Cl. .................................................. 360/97.01
(58) Field of Classification Search ............. 360/97.01, 360/97.02
See application file for complete search history.

(56) References Cited

U.S. PATENT DOCUMENTS 6,469,864 B2 * 10/2002 Kamezawa et al. ...... 360/97.01
6,498,700 B2 * 12/2002 Takahashi et al. ....... 360/97.01
6,950,275 B1 * 9/2005 Ali et al. .................. 360/97.02

FOREIGN PATENT DOCUMENTS

| JP | 8-69687 | 3/1996 |
|---|---|---|
| JP | 11-232862 | 8/1999 |
| JP | 11-328946 | 11/1999 |
| KR | 20-298221 | 12/2002 |

* cited by examiner

*Primary Examiner*—Angel Castro
(74) *Attorney, Agent, or Firm*—Staas & Halsey LLP

(57) ABSTRACT

A damping structure of a hard disk drive including a damping plate, attached to an upper surface of a cover member, to reduce a noise from an interior of the hard disk drive, and a resilient plate, provided to an edge of the cover member, to alleviate a shock applied to the cover member via resilient deformation of the resilient plate. The resilient plate is bent from the damping plate so as to be spaced apart from the upper surface of the cover member at a desired interval. The resilient plate is provided at a height higher than a protrusion formed along the edge of the cover member. The external shock applied to the cover member can be effectively alleviated, and the resilient plate may minimize a flaw that may be formed on the damping plate in the course of assembling the hard disk drive.

23 Claims, 8 Drawing Sheets

DAMPING STRUCTURE OF A HARD DISK DRIVE

CROSS-REFERENCE TO RELATED APPLICATION

This application claims the priority of Korean Patent Application No. 2004-6118, filed on Jan. 30, 2004, in the Korean Intellectual Property Office, the disclosure of which is incorporated herein in its entirety by reference.

BACKGROUND OF THE INVENTION

1. Field of the Invention

The present invention relates to a hard disk drive, and more particularly, to a damping structure for a hard disk drive, in which it is provided on a cover of the hard disk drive to alleviate an external shock.

2. Description of the Related Art

A hard disk drive (HDD) is one of the data storage devices in computers that reads data from and/or writes data onto a disk using a read/write head. During the reading and writing operations, the head is shifted to a desired position on the surface of the disk by an actuator, while flying over the recording surface of the spinning disk at a proper height.

FIG. 1 is an exploded perspective view illustrating one example of a conventional hard disk drive, and FIG. 2 is a vertical cross-sectional view of the hard disk drive in FIG. 1.

Referring to FIGS. 1 and 2, the hard disk drive includes a base member 11, a cover member 12, a spindle motor 30 mounted to the base member 11, one or more disks 20, mounted to the spindle motor 30, to store data, and an actuator 40 to move a read/write head to a desired position on the disk 20.

The spindle motor 30 is supported by a flange 31 fixed to the base member 11. A hub 33 is rotatably installed to a shaft 32 of the spindle motor 30 through a bearing 37, and the disk 20 is mounted around an outer periphery of the hub 33. Where a plurality of disks 20 are mounted into the outer periphery of the hub, a ring-shaped spacer 34 is installed around the outer periphery of the hub 33 to uniformly maintain a spacing between the disks 20. A clamp 35 is engaged to an upper end of the hub 33 to prevent the disk 20 from escaping from the hub 33.

The actuator 40 includes a swing arm 42 that is rotatably coupled to a pivot 42 installed to the base member 11, a suspension 46 installed to one end portion of the swing arm 44 for supporting and elastically biasing a slider 48, on which the head is mounted, toward the surface of the disk 20, and a voice coil motor (VCM) 50 to rotate the swing arm 44. The voice coil motor 50 is controlled by a servo control system. The swing arm 44 is rotated in a direction according to the Fleming's left-hand rule by the interaction between an electric current input to a VCM coil and a magnetic field generated by magnets. Specifically, when the disk 20 starts spinning as a result of the hard disk drive being turned on, the voice coil motor 50 rotates the swing arm 44 to move the head to a desired position on a recording surface of the disk 20. On the contrary, when the disk 120 stops spinning by turning the hard disk drive off, the voice coil motor 50 rotates the swing arm 44 to move the head away from the disk 20.

The cover member 12 is assembled to the upper portion of the base member 11 via a plurality of screws 18. A gasket 19 is interposed between the base member 11 and the cover member 12 in order to prevent inflow of a dust or moisture into an interior of the hard disk drive. The gasket 19 is generally made of a viscoelastic material, such as rubber, so that the gasket 19 may damp vibration of the hard disk drive.

The cover member 12 is formed with screw-receiving holes 14 and 15 to correspond to a shaft-fixing screw 16 that is fastened to a shaft 32 of the spindle motor 30 and a pivot-fixing screw 17 that fastened to a pivot 42 of the actuator 40, respectively. The cover member 12 is generally made of an aluminum alloy through die casting. A thin damping plate 60 of stainless steel is adhered to the upper surface of the cover member 12 via a viscoelastic double sided tape 61 in order to reduce a noise generated from the hard disk drive.

Since damping plate 60 is outwardly exposed, with the damping plate 60 being adhered to the upper surface of the cover member 12, a flaw, such as scratch, may occur on the surface of the damping plate 60 in a course of assembling the hard disk drive. This may lead to a deterioration of a quality of the appearance of the hard disk drive.

In order to solve the above problem, therefore, a protrusion 13 is formed along an edge of the cover member 12 in such a manner that the protrusion 13 is protruded by a height C from the upper surface of the damping plate 60.

If the hard disk drive inclines toward the cover member 12 and then falls on a table, the protrusion 13 of the cover member 12 first collides with the table. At this time, an impact load applied to the protrusion 13 is mostly transmitted to the hard disk drive. Specifically, the impact load is transmitted to the spindle motor 30 through the cover member 12 and the shaft-fixing screw 16, resulting in the damage of the bearing 37 and causing the disk 20 to vibrate. In addition, the impact load is transferred to the slider 48 of the actuator 40 through the cover member 12 and the pivot-fixing screw 17. Also, the impact load is transmitted to the base member 11 from the cover member 12 through the screws 18. The impact load is finally transferred to the slider 48 through the actuator 40 installed to the base member 11. As a result, the impact load that is transmitted to the slider 48 causes the slider 48 to vibrate, so that the head mounted to the slider 48 collides with the surface of the disk 20. This head slap phenomenon damages the head and the recording surface of the disk 20 and may bring about an error in the read/write operation of the hard disk drive.

SUMMARY OF THE INVENTION

The present invention provides a damping structure of a hard disk drive, in which the damping structure is provided on a cover member of the hard disk drive to alleviate effects of an external shock and to minimize any flaw that is formed on a damping plate during an assembling process.

According to an aspect of the present invention, a damping structure of a hard disk drive includes a base member and cover member, which enclose a spindle motor to rotate a data storage disk and an actuator to move a read/write head to a predetermined position on the disk. The damping structure comprises a damping plate, attached to an upper surface of the cover member, to reduce a noise from an interior of the hard disk drive; and a resilient plate, provided on the damping plate towards an edge of the cover member, to alleviate a shock applied to the cover member via a resilient deformation of the resilient plate, the resilient plate being bent from the damping plate so as to be spaced apart from the upper surface of the cover member at a desired interval.

According to this aspect of the invention, resilient plate may be provided to four corners of the cover member, respectively. A plurality of the resilient plates may be provided to a side of the cover member. Also, the resilient plate may be provided to the entire edge of the cover member.

According to another aspect of the present invention, a damping structure of a hard disk drive includes a base member and cover member, which enclose a spindle motor to rotate a data storage disk and an actuator to move a read/write head to a proper position on the disk, and at least one screw-receiving hole being formed on an upper surface of the cover member The damping structure further includes a shock-absorbing spring member including a ring-shape supporting plate attached to the upper surface of the cover member around the screw-receiving hole, and a resilient plate, provided one the damping plate towards the cover member, to alleviate a shock applied to the cover member via a resilient deformation of the resilient plate, the resilient plate being bent from an outer periphery of the supporting plate so as to be spaced apart from the upper surface of the cover member at a desired interval.

According to this aspect of the invention, a damping plate may be attached to the upper surface of the cover member to reduce a noise from an interior of the hard disk drive, except for a portion in which the shock-absorbing member is positioned. The supporting plate may be adhered to the upper surface of the cover member by a viscoelastic double sided tape, and the supporting plate may be secured to the cover member by a screw. In addition, a plurality of radially extended slots may be formed on the resilient plate along a circumferential direction of the resilient plate at regular intervals. The resilient plate may be provided at a height higher than a protrusion formed along the edge of the cover member. The damping plate may be adhered to the upper surface of the cover member by a viscoelastic double sided tape. An end portion of the resilient plate may be bent toward the cover member.

In addition, a protector is provided between the resilient plate and the cover member to prevent an alien substance from invading therein. In this case, an interval between the protector and the resilient plate has a dimension so that the resilient plate does not interfere with deformation of the resilient plate. The protector is integrally formed with the cover member, or is attached to the upper surface of the cover member as a separate member. In the latter, the protector is made of a viscoelastic material.

A damping member may be attached to a position of the upper surface of the cover member corresponding to an end portion of the resilient plate.

According to the aspects of the invention listed above, the present invention may alleviate an external shock and minimize a flaw to be formed on a damping plate at an assembling process.

Additional and/or other aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
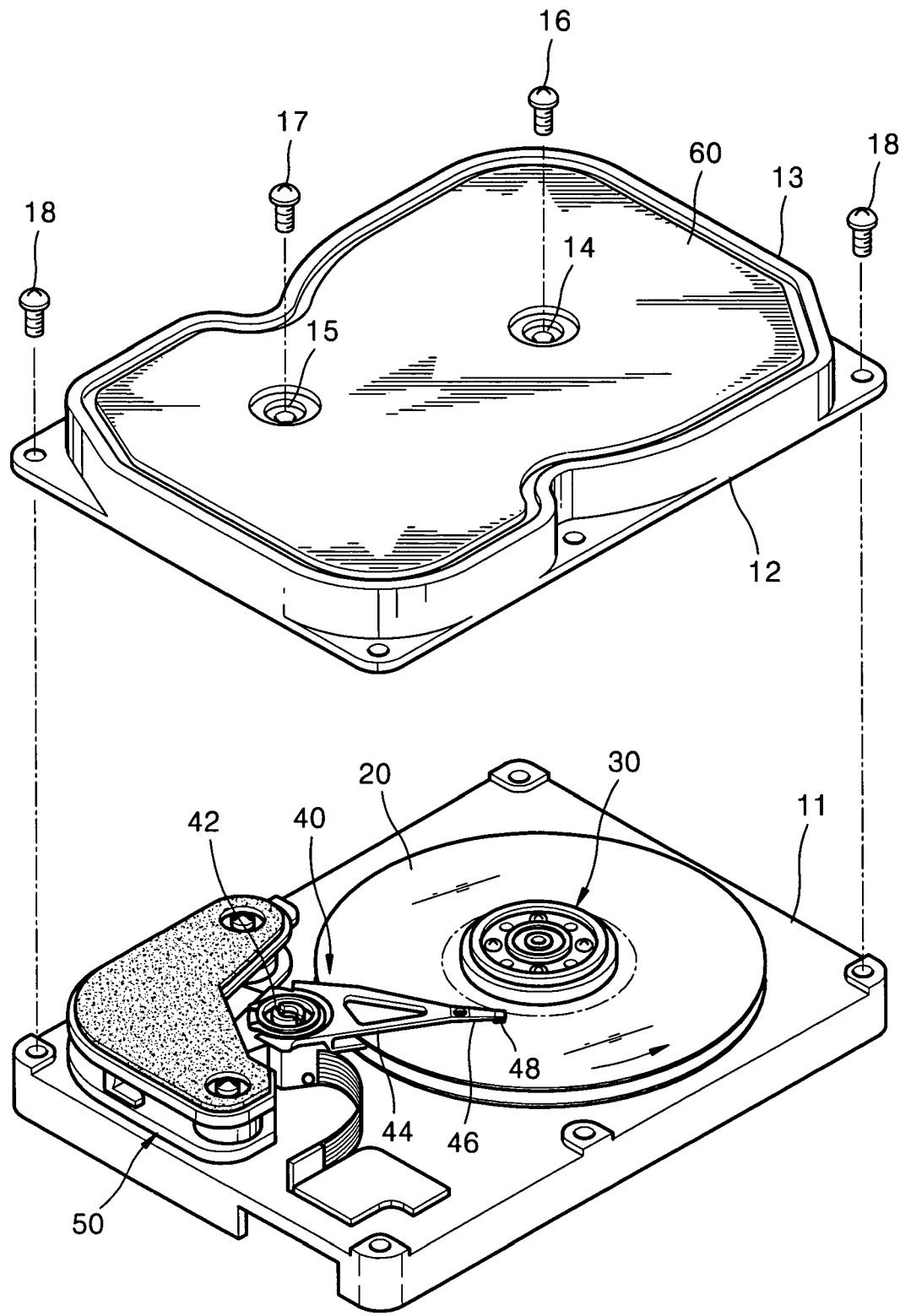
FIG. 1 is an exploded perspective view illustrating one example of a conventional hard disk drive.
Figure 2:
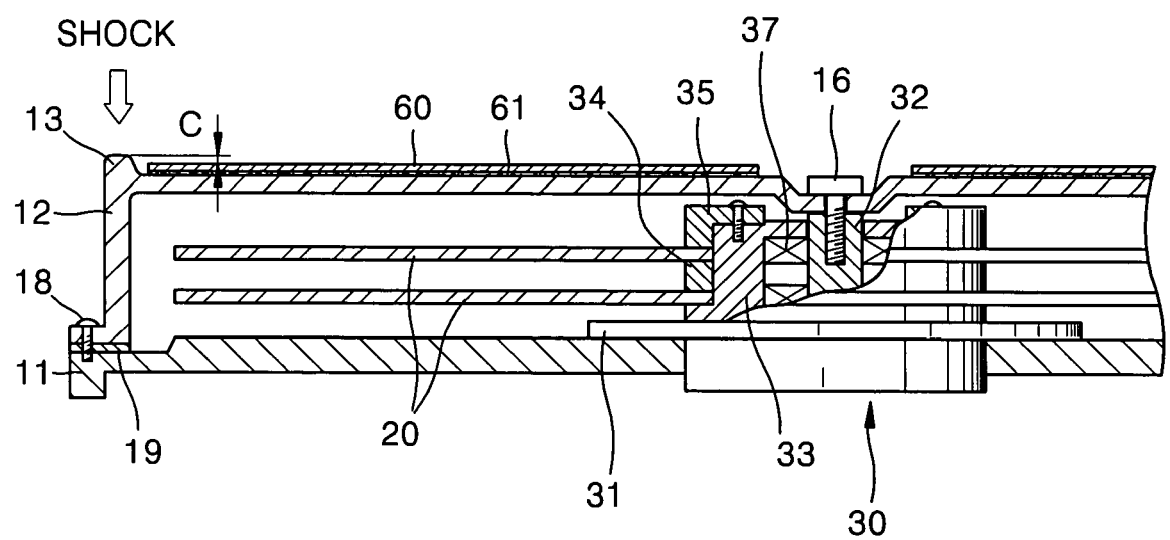
FIG. 2 is a vertical cross-sectional view of the hard disk drive in FIG. 1.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3:
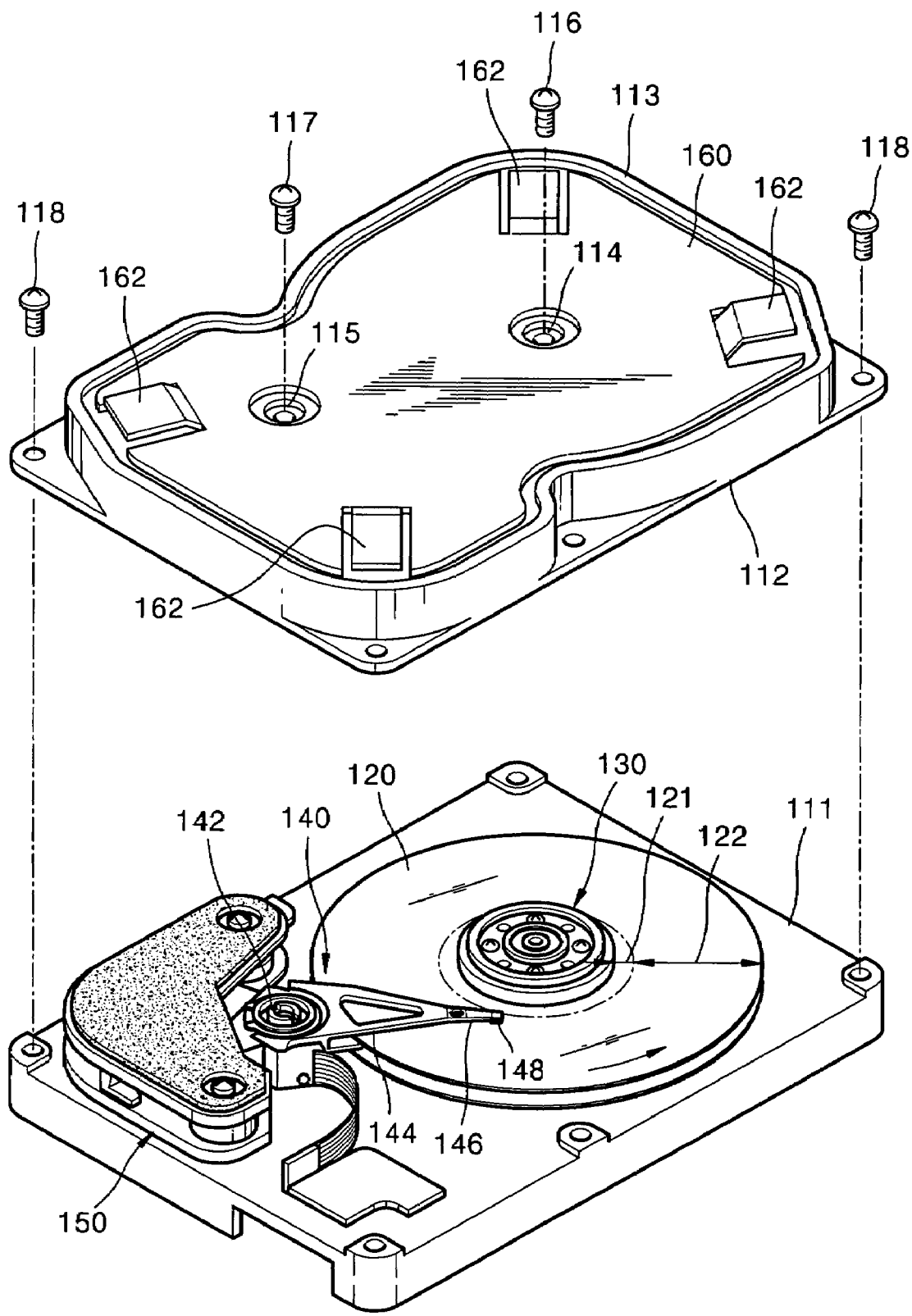
FIG. 3 is an exploded perspective view illustrating a hard disk drive employing a damping structure according to a first embodiment of the present invention.
Figure 4:
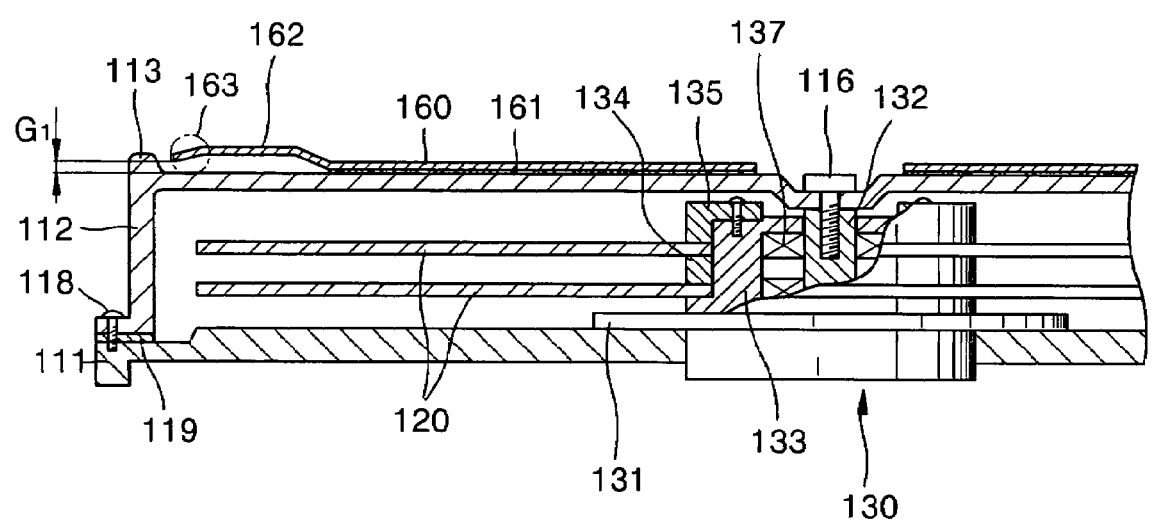
FIG. 4 is a vertical cross-sectional view of the hard disk drive and the damping structure in FIG. 3.

FIG. 3 is an exploded perspective view illustrating a hard disk drive employing a damping structure according to a first embodiment of the present invention, and FIG. 4 is a vertical cross-sectional view of the hard disk drive and the damping structure in FIG. 3.

Referring to FIGS. 3 and 4, the hard disk drive includes a disk 120 for storing data, a spindle motor 130 to rotate the disk 120, and an actuator 140 to move a read/write head to a predetermined position on the disk 120. The disk 120, the spindle motor 130 and the actuator 140 are enclosed and protected by a base member 111 and a cover member 112.

The disk 120 is a recording medium to record the data. The disk 120 is provided with a parking zone 121 on an inner periphery thereof to park the head when the hard disk drive stops operating, and a data zone 122 on an outer periphery thereof on which data may be recorded.

A flange 131, fixed to the base member 111, supports the spindle motor 130. The spindle motor turns the disk 120. A hub 133 is rotatably installed to a shaft 132 of the spindle motor 130 through a bearing 137, and at least one disk 120 is mounted around an outer periphery of the hub 133 of the spindle motor 130. Where a plurality of disks 120 are mounted to the spindle motor 130, a ring-shaped spacer 134 is installed between the disks 120 to uniformly maintain a spacing between the disks 120. A clamp 135 is engaged to an upper end of the hub 133 of the spindle motor 130 to prevent the disk 120 from escaping from the hub.

The actuator 140 moves a read/write head to write data on the disk or to read the recorded data from a desired position on the disk 120, and is rotatably installed to the base member 111. Specifically, the actuator 140 includes a swing arm 144 that is rotatably coupled to a pivot 142 installed to the base member 111, a suspension 146 installed to one end portion of the swing arm 144 to support and elastically bias a slider 148, on which the head is mounted, toward a surface of the disk 120, and a voice coil motor (VCM) 150 to rotate the swing arm 144.

The voice coil motor 150 is controlled by a servo control system, and the swing arm 144 is rotated in a direction according to the Fleming's left-hand rule by the interaction between an electric current input to a VCM coil and a magnetic field generated by magnets. Specifically, when the disk 120 starts spinning by turning the hard disk drive on, the voice coil motor 150 rotates the swing arm 144 in a clockwise direction to move the write/read head on the data zone 122 from the parking zone 121 of the disk 120. The slider 148 rises from the surface of the disk at a determined height due to a lift generated by the spinning disk 120. In this state, the head mounted on the slider 148 reads the data from or writes the data on the recording surface of the disk 120. On the contrary, when the disk 120 stops spinning by turning the hard disk drive off, the voice coil motor 150 rotates the swing arm 144 in a counterclockwise direction to park the slider 148 in the parking zone 121 of the disk 120.

A head parking system includes a contact start stop (CSS) mode and a ramp loading mode. According to the head parking system operating in the ramp loading mode, in order to secure a more wide data storage space, a ramp (not shown) is provided to an outside of the disk 120 to park the head on the ramp, instead of the parking zone 121 provided to an inner periphery of the disk 120. The present invention may be applied to the hard disk drive including the head parking system of the ramp loading mode, as well as the CSS mode.

The cover member 112 is assembled to the upper portion of the base member 111 via a plurality of screws 118. A gasket 119 is interposed between the base member 111 and the cover member 112 in order to prevent an inflow of dust or moisture into an interior of the hard disk drive. The gasket 119 is generally made of a viscoelastic material, such as rubber, so that the gasket 119 may damp vibration of the hard disk drive.

The cover member 112 is formed with screw-receiving holes 114 and 115 to correspond to a shaft-fixing screw 116 that is fastened to a shaft 132 of the spindle motor 130 and a pivot-fixing screw 117 that is fastened to a pivot 142 of the actuator 140, respectively.

In the hard disk drive is configured as described above, the damping structure of the present invention is provided to be attached to the cover member 112 so as to alleviate effects of an external shock applied to the cover member 112.

The damping structure according to a first embodiment of the present invention includes a damping plate 160 attached to the upper surface of the cover member 112 to reduce a noise from an interior of the hard disk drive, and a resilient plate 162 provided on the damping plate towards an edge of the cover member 112 so as to alleviate a shock applied to the cover member 112.

Specifically, the cover member 112 is generally made of an aluminum alloy through a process of die casting. A thin damping plate 160 made by pressing a sheet of stainless steel is adhered to the upper surface of the cover member 112. In an embodiment of the invention, the damping plate 160 is adhered to the upper surface of the cover member 112 via a double sided tape 161 of a viscoelastic material to absorb the impact load.

The resilient plate 162 serves as a spring, which is deformed due to the shock applied to the cover member 112, to absorb the impact load. Specifically, the resilient plate 162 is provided to each of the four corners of the cover member 112. The respective resilient plates 162 are bent from the damping plate 160 so as to be spaced apart from the upper surface of the cover member 112 at a desired interval. An interval $G_1$ between an end portion 163 of the resilient plate 162 and the cover member 112 is set such that, under normal circumstances, when the resilient plate 162 is deformed with the impact load applied to the resilient plate 162, the end portion 163 may not contact the upper surface of the cover member 112. The interval $G_1$ between an end portion 163 of the resilient plate 162 and the cover member 112 may be properly designed depending upon the number of the resilient plates 162 that are provided, and thickness, width and length of each of the resilient plates 163. In other words, the interval $G_1$ may be adjusted by controlling a rigidity of the resilient plate 162.

The resilient plate 162 is formed at a height that is higher than that of a protrusion 113 formed along the edge of the cover member 112 such that the external shock is not directly applied to the cover member 112.

Since the resilient plate 162 is formed through the press operation as described above, the end portion 163 of the resilient plate 162 may have a sharp corner. Hence, there is a danger in that a person may get cut on a hand with the sharp corner when handling the hard disk drive. Accordingly, the end portion 163 of the resilient plate 162 may be slightly bent toward the cover member 112 in order to prevent the above danger.

The operation of the damping structure according to the first embodiment of the present invention will now be described.

If the hard disk drive inclines toward the cover member 112 and then falls on a table, the resilient plate 162 firstly collides with the table. At this time, the resilient plate 162 is deformed by the shock to primarily absorb and alleviate the impact load, and the double sided tape 161 of a viscoelastic material secondarily absorbs the impact load, so that the portion of the impact load that is transferred to the interior of the hard disk drive may be remarkably reduced. Specifically, a force reacting against the impact load, which tends to separate the damping plate 160 from the cover member 112, acts on the damping plate 160. At this time, the double sided tape 161 of a viscoelastic material that is interposed between the damping plate 160 and the cover member 112 is locally deformed by the force, so as to secondarily absorbing the impact load. Furthermore, since an area of the double sided tape 161 is significantly wide, a phenomenon in which the damping plate 162 is detached from the cover member 112 may be avoided.

As is described above, according to the damping structure of the present invention, the portion of the impact load that is finally transferred to the interior of the hard disk drive is remarkably reduced in relation to the magnitude of the initial impact load, so as to prevent the head slap from happening due to the external shock. In addition, since the resilient plate 162 is formed at a height higher than the upper surface of the damping plate 160, the resilient plate 162 may minimize the flaw to be formed on the damping plate 160 in the course of assembling the hard disk drive.

Figure 5A:
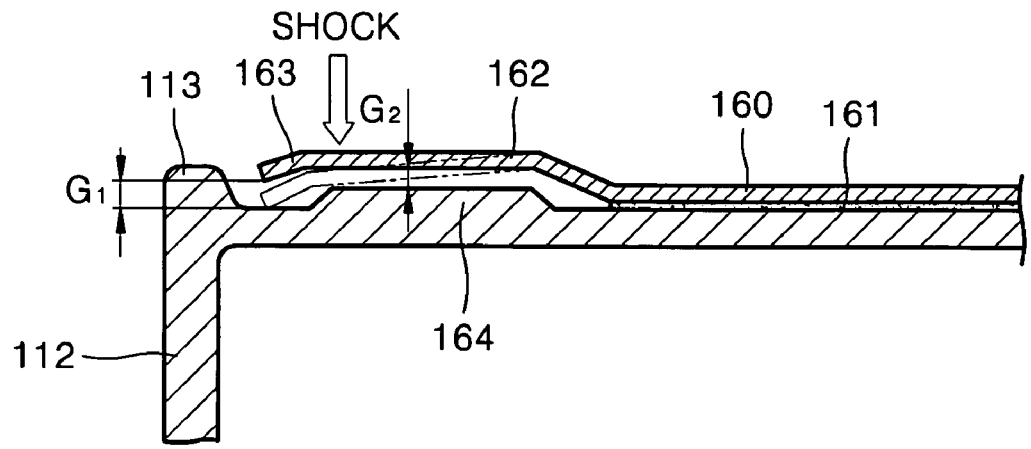
FIGS. 5A, 5B and 5C are views illustrating alternative embodiments of the damping structure in FIG. 4.
Figure 5B:
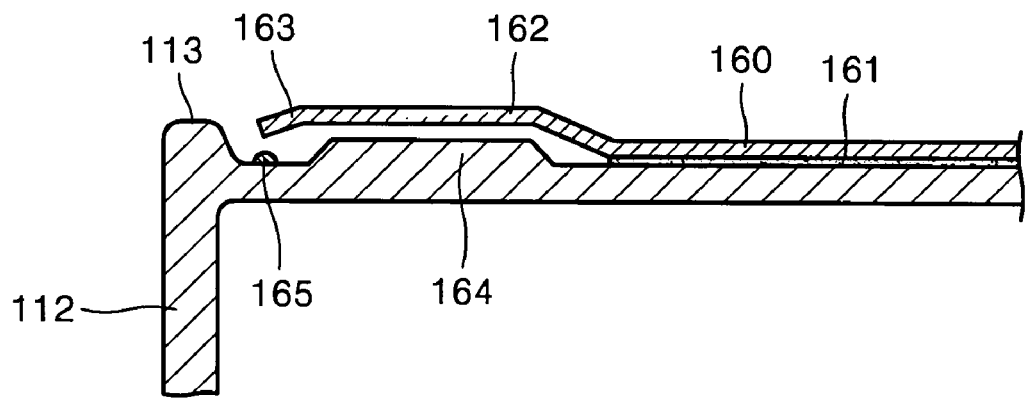
Figure 5C:
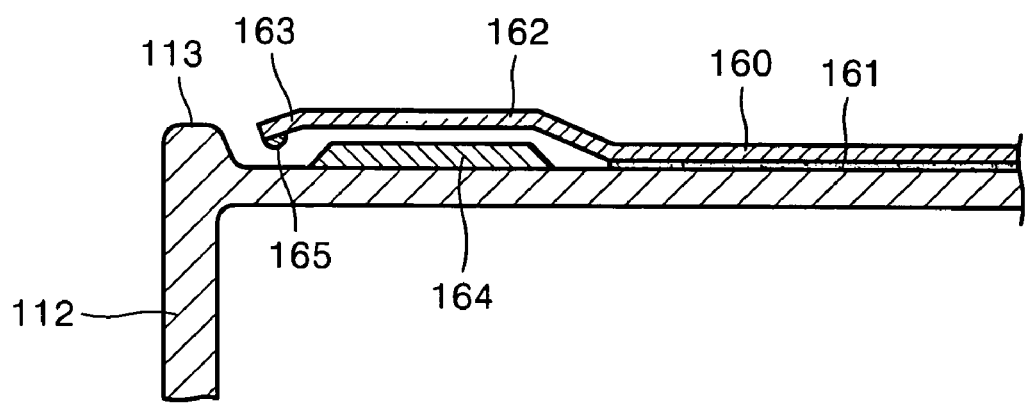

FIGS. 5A, 5B and 5C illustrate alternative embodiments of the damping structure in FIG. 4.

Referring to FIG. 5A, since the resilient plate 162 is spaced apart from the upper surface of the cover member 112 at a desired interval $G_1$, an alien substance may invade between the resilient plate 162 and the cover member 112. In order to prevent the invasion of the alien substance, a protector 164 may be provided between the resilient plate 162 and the cover member 112. According to this embodiment of the invention, the protector 164 is protruded from the upper surface of the cover member 112 and is spaced apart from the resilient plate 162 at a desired interval $G_2$. The interval $G_2$ between the protector 164 and the resilient plate 162 has a sufficiently small shape such that the protector 164 does not interfere with the deformation of the resilient plate 162. When the resilient plate 162 is deformed by the external shock, the interval $G_2$ is sufficiently large such that the resilient plate 162 does not contact the protector 164 before the end portion 163 of the resilient plate 162 contacts the upper surface of the cover member 112. Accordingly, the resilient plate 162 may obtain a proper amount of the deformation of the resilient plate 162 due to the external shock.

The protector 164 may be integrally formed with the cover member 112, as shown in FIG. 5A, but also may be attached to the upper surface of the cover member 112 as a separate member, as shown in FIG. 5C. Where the protector 164 is attached to the upper surface of the cover member as a separate member, the protector 164 may be made of a viscoelastic material, such as rubber or polymer. Additionally, when the resilient plate 162 is deformed above a predetermined limit of deformation due to the impact load of above allowable limitation and collides with the protector 164, the protector 164 may absorb and alleviate the impact load.

Referring to FIG. 5B, in an additional embodiment of the invention, a damping member 165 may be attached to a position on the cover member 112 corresponding to the end portion 163 of the resilient plate 162. As shown in FIG. 5C, the damping member 165 may also be attached to a bottom of the end portion 163 of the resilient plate 162. The damping member 165 may be made of a viscoelastic material, such as rubber and polymer. When an impact load above the allowable limitation is applied to the resilient plate 162, the resilient plate 162 is deformed above a proper amount of deformation. Accordingly, the end portion 163 of the resilient plate 162 contacts the upper surface of the cover member 112, so that the impact load is directly transferred to the cover member 112. However, where the damping member 165 is provided between the cover member 112 and the end portion 163 of the resilient plate 162, the damping member 165 absorbs the impact load transferred to the cover member 112.

Figure 6:
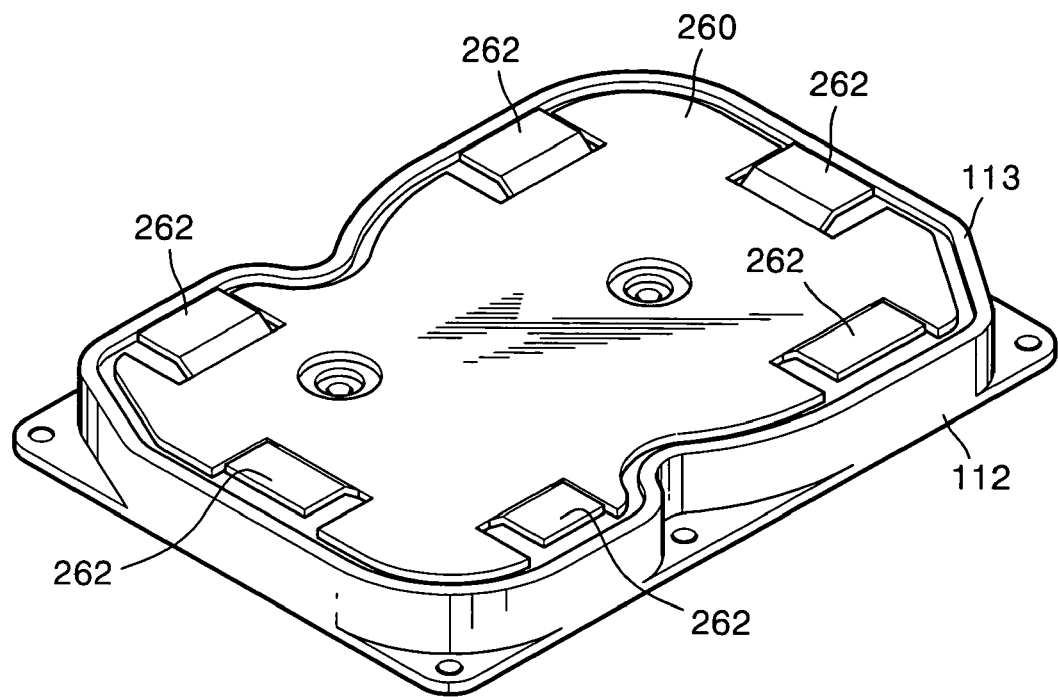
FIG. 6 is a perspective view illustrating a damping structure according to a second embodiment of the present invention.
Figure 7:
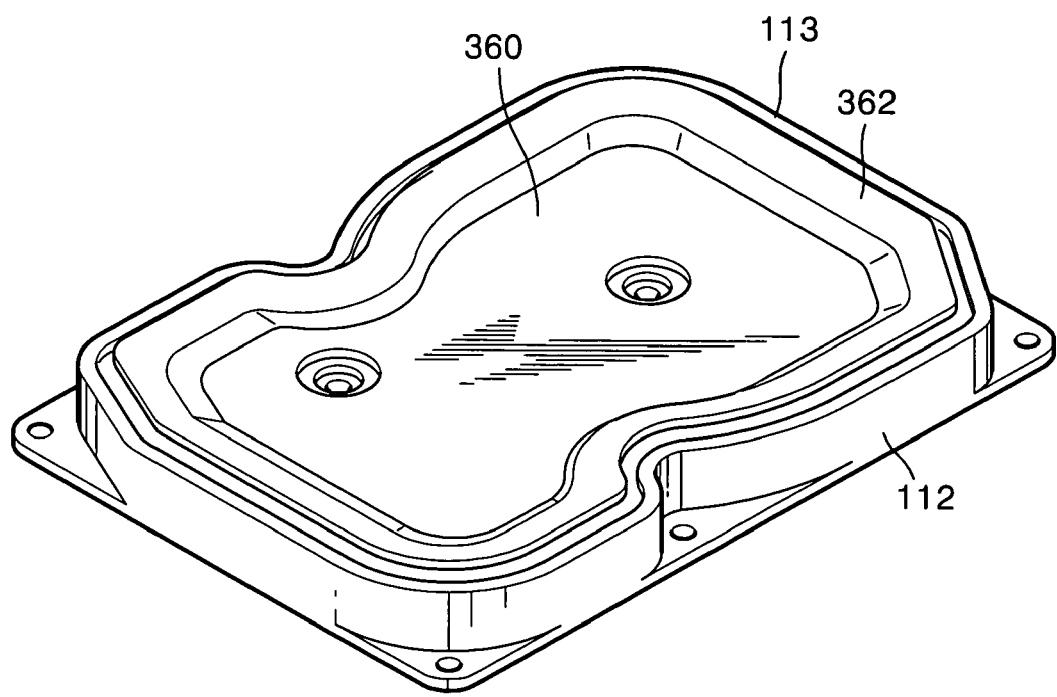
FIG. 7 is a perspective view illustrating a damping structure according to a third embodiment of the present invention.

FIG. 6 is a perspective view illustrating a damping structure according to a second embodiment of the present invention, and FIG. 7 is a perspective view illustrating a damping structure according to a third embodiment of the present invention. The embodiments shown in FIGS. 6 and 7 are similar to the first embodiment, except for the position of the resilient plate. Differences between the embodiments will now be described in brief.

Referring to FIG. 6, the damping structure according to the second embodiment of the present invention includes a damping plate 260 that is attached to the upper surface of the cover member 112 to reduce a noise that is generated from the interior of the hard disk drive, and a resilient plate 262 to alleviate the shock that is applied to the cover member 112. In particular, in according to this embodiment, resilient plates 262 of a plurality of the resilient plates 262 are provided to a side of the cover member 112. Specifically, each of the resilient plates 262 is bent from the side of the damping plate 260 so that the resilient plate 262 is spaced apart from the upper surface of the cover member 112 at a desired interval.

Referring to FIG. 7, the damping structure according to the third embodiment of the present invention includes a damping plate 360 attached to the upper surface of the cover member 112, and a resilient plate 362 to alleviate the shock applied to the cover member 112. In particular, the resilient plate 362 is provided on the damping plate 360 towards the entire edge of the cover member 112. Specifically, the resilient plate 362 is bent from the entire edge of the damping plate 360 so that the resilient plate 362 is spaced apart from the upper surface of the cover member 112 at a desired interval.

The operation and effect of the damping structures according to the second and third embodiments of the present invention are identical with those of the first embodiment of the present invention. In addition, the alternative embodiments shown in FIGS. 5A through 5C may apply to the damping structure according to the second and third embodiments of the present invention.

Figure 8:
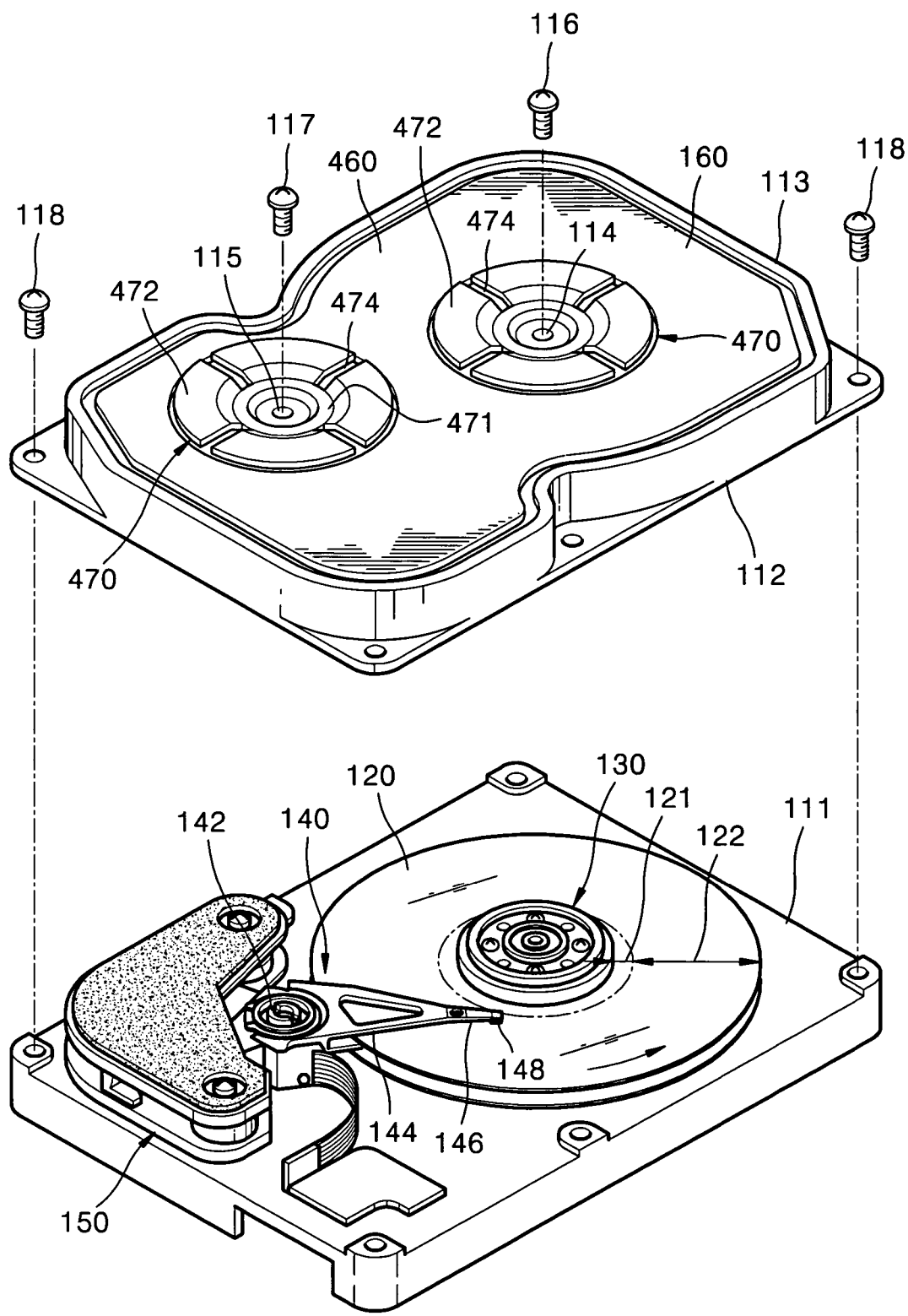
FIG. 8 is an exploded perspective view illustrating a hard disk drive employing a damping structure according to a fourth embodiment of the present invention.
Figure 9:
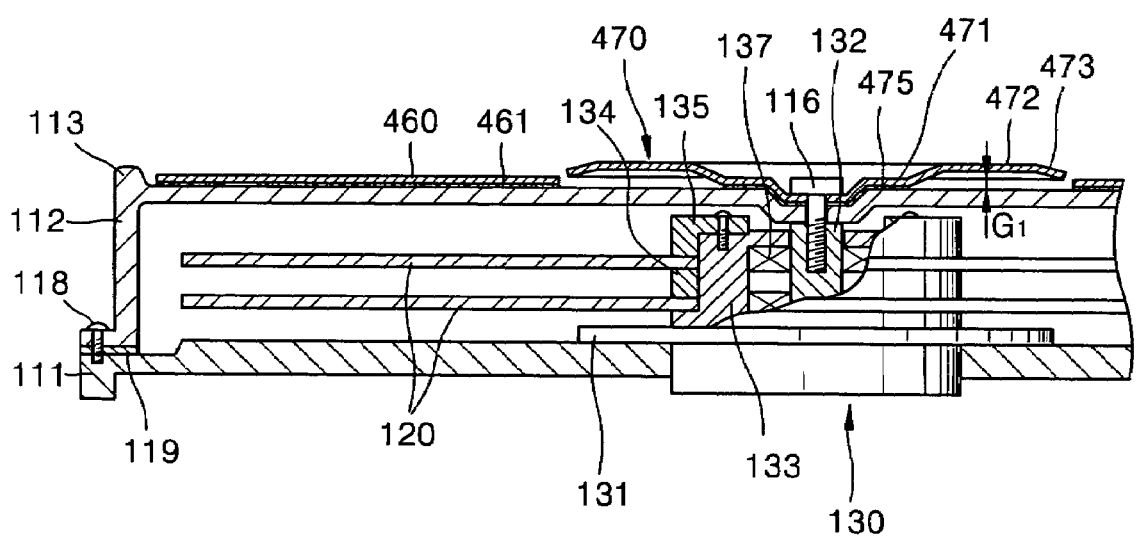
FIG. 9 is a vertical cross-sectional view of the hard disk drive and the damping structure in FIG. 8.

FIG. 8 is an exploded perspective view illustrating a hard disk drive employing a damping structure according to a fourth embodiment of the present invention, and FIG. 9 is a vertical cross-sectional view of the hard disk drive and the damping structure in FIG. 8.

Referring to FIGS. 8 and 9, the damping structure according to the fourth embodiment of the present invention includes a shock-absorbing spring member 470 installed around screw-receiving holes 114 and 115 formed on the upper surface of the cover member 112.

As is described above, the screw-receiving holes 114 and 115 penetrating through the cover member 112 are to receive the shaft-fixing screw 116 that is fastened to the shaft 132 of the spindle motor 130 and the pivot-fixing screw 117 that is fastened to the pivot 142 of the actuator 140, respectively. According to an embodiment of the invention, only one of the two screw-receiving holes 114 and 115 may be formed on the cover member 112. Where a hydro-dynamic pressure bearing is used in the spindle motor 130, the screw 116 is not fastened to the shaft 132 of the spindle motor 130. In this case, the cover member 112 is formed with the screw-receiving hole 115 only to receive the pivot-fixing screw 117. Accordingly, one or two shock-absorbing spring members 470 may be provided. In addition, even though two screw-receiving holes 114 and 115 are formed on the cover member 112, the shock-absorbing spring member 470 may be installed, around only one of the two screw-receiving holes 114 and 115.

The shock-absorbing spring member 470 includes a ring-shape supporting plate 471 that is attached to the upper surface of the cover member 112 around the screw-receiving holes 114 and 115, and a resilient plate 472, that is bent from an outer periphery of the supporting plate 471 and spaced apart from the upper surface of the cover member 112, to alleviate the portion of the impact load applied to the cover member 112.

Specifically, in an embodiment of the invention, the supporting plate 471 may be attached to the upper surface of the cover member 112 via a double sided tape 475 of a viscoelastic material to absorb the impact load. The supporting plate 471 is firmly secured to the cover member 112 by means of the screws 116 and 117.

According to this embodiment of the invention, the resilient plate 472 serves as a spring, which is deformed by the shock applied to the cover member 112 and which absorbs the impact load. An interval $G_1$ between an end portion 473 of the resilient plate 472 and the cover member 112 is set as the first embodiment described above.

A plurality of radially extended slots 474 may be formed on the resilient plate 472 along a circumferential direction of the resilient plate 472 at regular intervals. The plurality of slots 474 allows the resilient plate 473 to easily deform when the external shock is applied to the resilient plate 473. By adjusting the number and width of the slots 474, the rigidity of the resilient plate 472 may be properly controlled.

As in the above first embodiment, the resilient plate 472 is formed at a height higher than the protrusion 113 formed on the edge of the cover member 112 so that the external shock is not directly applied to the cover member 112. According to the embodiment, the end portion 473 is slightly bent toward the cover member 112 so as to prevent the hand from being injured by a sharp corner.

In the damping structure according to the fourth embodiment of the present invention, a damping plate 460 may be provided to reduce a noise from the interior of the hard disk drive. In the embodiment, the damping plate 460 is attached to the upper surface of the cover member 112, except for a portion thereof to which the shock-absorbing spring member 470 is installed. According to this embodiment, the damping plate 460 may be attached to the upper surface of the cover member 112 by use of a double sided tape 461 of a viscoelastic material.

Alternative embodiments shown in FIGS. 5A, 5B and 5C may be applied to the damping structure according to the fourth embodiment of the present invention.

The operation of the damping structure according to the fourth embodiment of the present invention will now be described.

If the hard disk drive having the damping structure inclines toward the cover member 112 and then falls on a table, the resilient plate 472 of the shock-absorbing spring member 470 first collides with the table. At this time, the resilient plate 472 is deformed by the shock to primarily absorb and alleviate the impact load, and the double sided tape 475 of a viscoelastic material secondarily absorbs the remaining impact load, so that the portion of the impact load that is transferred to the spindle motor 130 and the actuator 140 within the interior of the hard disk drive through the screws 116 and 117 may be remarkably reduced. In addition, since the supporting plate 471 of the shock-absorbing spring member 470 is fixed to the cover member 112 via the screws 116 and 117, the phenomenon in which the supporting plate 471 is separated from the cover member 112 by a reacting force against the impact load that is applied to the resilient plate 472 is reduced.

As is described above, according to the damping structure of the present invention, since the resilient plate provided on the edge of the damping plate attached to the upper surface of the cover member is formed at a height higher than the protrusion of the cover, the external shock applied to the cover member may be effectively alleviated, so as to prevent a head slap phenomenon from occurring due to the external shock.

In addition, since the resilient plate is formed at a height that is higher than the upper surface of the damping plate, the resilient plate may minimize a flaw that is formed on the damping plate in the course of assembling the hard disk drive.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A damping structure of a hard disk drive, including a base member and cover member, which enclose close a spindle motor to rotate a data storage disk and an actuator to move a read/write head to a predetermined position on the disk, the damping structure comprising:
a damping plate, attached to an upper surface of the cover member, to reduce a noise from an interior of the hard disk drive; and
a resilient plate, provided on the damping plate towards an edge of the cover member, to alleviate a shock applied to the cover member via resilient deformation of the resilient plate, the resilient plate being bent from the damping plate so as to be spaced apart from the upper surface of the cover member at a desired interval.

2. The damping structure as claimed in claim 1, further comprising four corners of the cover member, wherein the resilient plate is plural in number and located at each of the four corners of the cover member.

3. The damping structure as claimed in claim 1, wherein a plurality of the resilient plates are provided to a side of the cover member.

4. The damping structure as claimed in claim 1, wherein the resilient plate is provided along an entire edge of the cover member.

5. The damping structure as claimed in claim 1, further comprising a protrusion formed along the edge of the cover member, wherein the resilient plate is provided at a height that is higher than the protrusion.

6. The damping structure as claimed in claim 1, wherein the damping plate is adhered to an upper surface of the cover member by a viscoelastic double sided tape.

7. The damping structure as claimed in claim 1, wherein an end portion of the resilient plate is bent toward the cover member.

8. The damping structure as claimed in claim 1, further comprising a protector provided between the resilient plate and the cover member, to prevent an alien substance from invading therein, in which the protector protrudes from the upper surface of the cover member and is spaced apart from the resilient plate.

9. The damping structure as claimed in claim 8, wherein an interval between the protector and the resilient plate is sufficiently large such that the protector does not interfere with deformation of the resilient plate.

10. The damping structure as claimed in claim 8, wherein the protector is integrally formed with the cover member.

11. The damping structure as claimed in claim 8, wherein the protector is attached to the upper surface of the cover member as a separate member.

12. The damping structure as claimed in claim 11, wherein the protector is made of a viscoelastic material.

13. The damping structure as claimed in claim 1, wherein a damping member is attached to a position of the upper surface of the cover member corresponding to an end portion of the resilient plate.

14. The damping structure as claimed in claim 1, wherein a damping member is attached to a bottom of an end portion of the resilient plate.

15. A damper of a disk drive, including a base member and cover member having an edge and an upper surface, the damper comprising:
a damping plate, attached to the upper surface of the cover member; and
a resilient plate, provided on a portion of the damping plate located near the edge of the cover member, to resiliently deform as a result of an impact on the disk drive, the resilient plate being bent upward from the damping plate so as to be spaced apart from the upper surface of the cover member at an interval that is sufficiently large such that the deformed resilient plate does not contact the cover member.

16. The damper according to claim 15, further comprising four corners of the cover member, wherein the resilient plate is plural in number and respectively provided on the damping plate proximate to each of the four corners.

17. The damper according to claim 15, further comprising sides of the cover member, wherein the resilient plate is plural in number and respectively provided on the damping plate proximate to the sides of the cover member.

18. The damper according to claim 15, further comprising an edge extending around substantially all of the cover member, wherein the resilient plate is provided on the damping plate proximate to the edge of the cover member.

19. The damper according to claim 15, further comprising a protrusion formed along the edge of the cover member, wherein the resilient plate is bent upward at a height that is higher than the protrusion.

20. The damper according to claim 15, further comprising a viscoelastic double sided tape to adhere the damping plate to the upper surface of the cover member.

21. The damper according to claim 15, further comprising an end portion of the resilient plate to be bent toward the cover member.

22. A damper of a disk drive, including a base member and cover member having an edge, sides, and an upper surface, the damper comprising:

a damping plate, attached to the upper surface of the cover member; and a plurality of resilient plates, provided on a portion of the damping plate located near the sides of the cover member, to resiliently deform as a result of an impact on the disk drive, the resilient plate being bent upward from the damping plate so as to be spaced apart from the upper surface of the cover member at an interval that is sufficiently large such that the deformed resilient plate does not contact the cover member.

23. A damper of a disk drive, including a base member and cover member having an edge extending around the cover member, and an upper surface, the damper comprising:

a damping plate, attached to the upper surface of the cover member; and a resilient plate, provided on a portion of the damping plate located near the edge of the cover member, to resiliently deform as a result of an impact on the disk drive, the resilient plate being bent upward from the damping plate so as to be spaced apart from the upper surface of the cover member at an interval that is sufficiently large such that the deformed resilient plate does not contact the cover member.

* * * * *